(12) United States Patent
Guzman et al.

(10) Patent No.: US 10,279,572 B2
(45) Date of Patent: May 7, 2019

(54) SOFTENING STRIP FOR CONTROLLING STRESS IN JOINTS AT VERY LOW TEMPERATURES

(71) Applicant: The Boeing Company, Chicago, IL (US)

(72) Inventors: Juan Carlos Guzman, Seattle, WA (US); Douglas A. McCarville, Bonney Lake, WA (US); Michael Leslie Hand, Huntington Beach, CA (US); Michael James Robinson, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 15/174,193

(22) Filed: Jun. 6, 2016

(65) Prior Publication Data

US 2017/0348954 A1 Dec. 7, 2017

(51) Int. Cl.
| | | |
|---|---|---|
| *B64G 1/00* | (2006.01) | |
| *B64G 1/40* | (2006.01) | |
| *B32B 5/02* | (2006.01) | |
| *B32B 37/12* | (2006.01) | |
| *B32B 38/00* | (2006.01) | |

(52) U.S. Cl.
CPC .............. *B32B 37/12* (2013.01); *B32B 5/024* (2013.01); *B32B 38/0012* (2013.01); *B32B 2037/1253* (2013.01); *B32B 2305/076* (2013.01); *B32B 2313/04* (2013.01); *B32B 2363/00* (2013.01); *B32B 2439/00* (2013.01); *B32B 2605/18* (2013.01); *B64G 1/002* (2013.01); *B64G 1/402* (2013.01); *F17C 2270/0194* (2013.01); *F17C 2270/0197* (2013.01)

(58) Field of Classification Search
CPC . B64G 1/402; B64G 1/002; F17C 2270/0194; F17C 2270/0197; B32B 2305/076
See application file for complete search history.

(56) References Cited

U.S. PATENT DOCUMENTS

| | | | |
|---|---|---|---|
| 8,656,571 B2 | 2/2014 | Hand | |
| 2003/0104737 A1* | 6/2003 | Green | B44C 5/00 442/104 |
| 2007/0205201 A1* | 9/2007 | Cundiff | F17C 1/04 220/591 |
| 2013/0136527 A1 | 5/2013 | Robinson et al. | |
| 2013/0193151 A1 | 8/2013 | Robinson et al. | |

* cited by examiner

*Primary Examiner* — Carson Gross
(74) *Attorney, Agent, or Firm* — Yee & Associates, P.C.

(57) ABSTRACT

A hybrid softening strip for controlling stresses in a joint at low temperatures includes a layer of sacrificial material that can be tailored to fit the softening strip in the joint after the softening strip has been bonded to a structure.

14 Claims, 17 Drawing Sheets

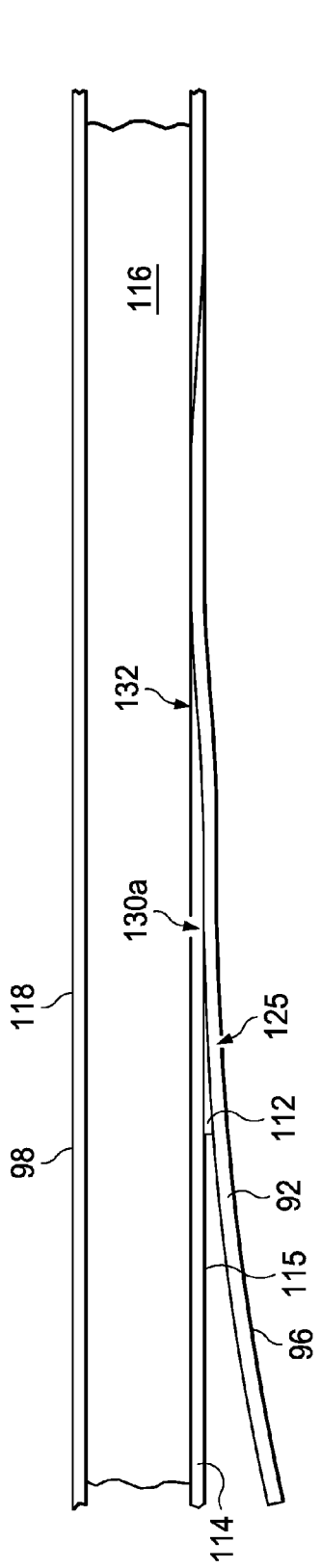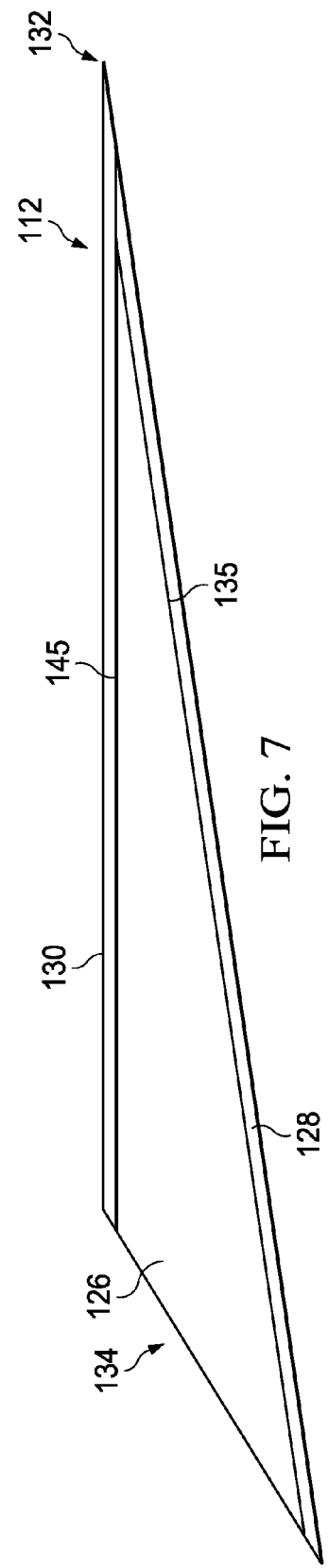

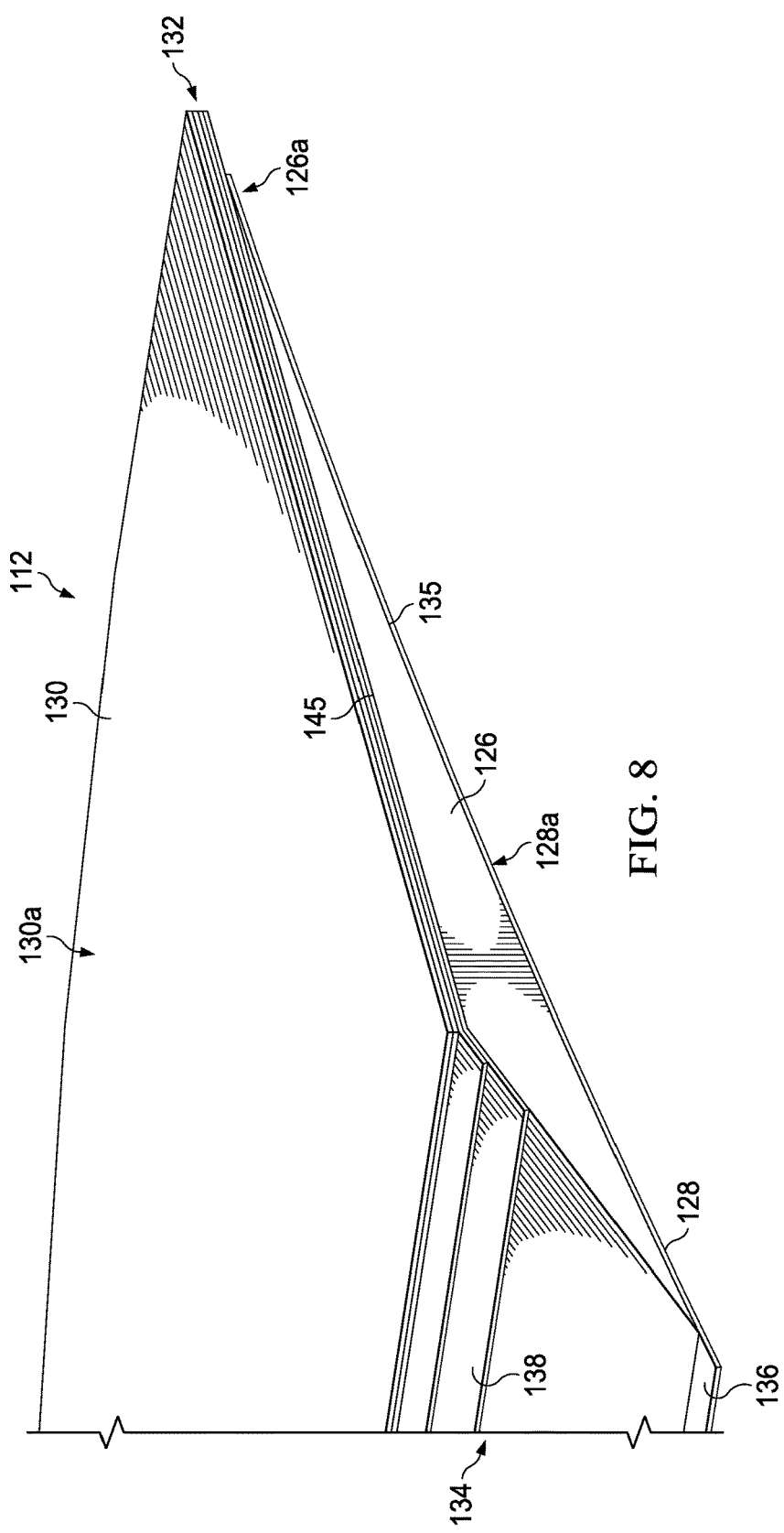

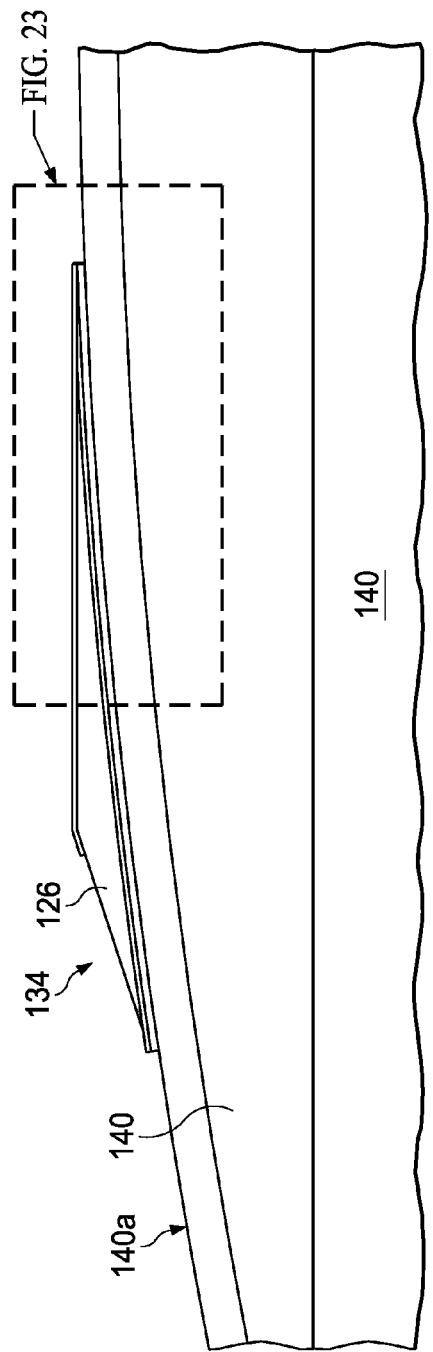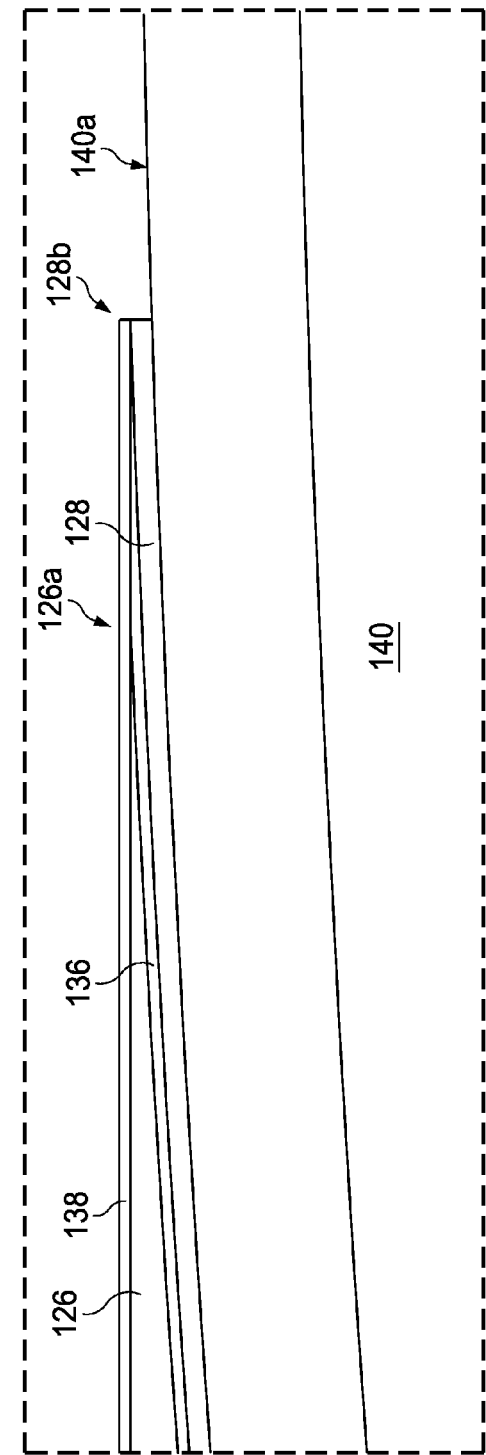

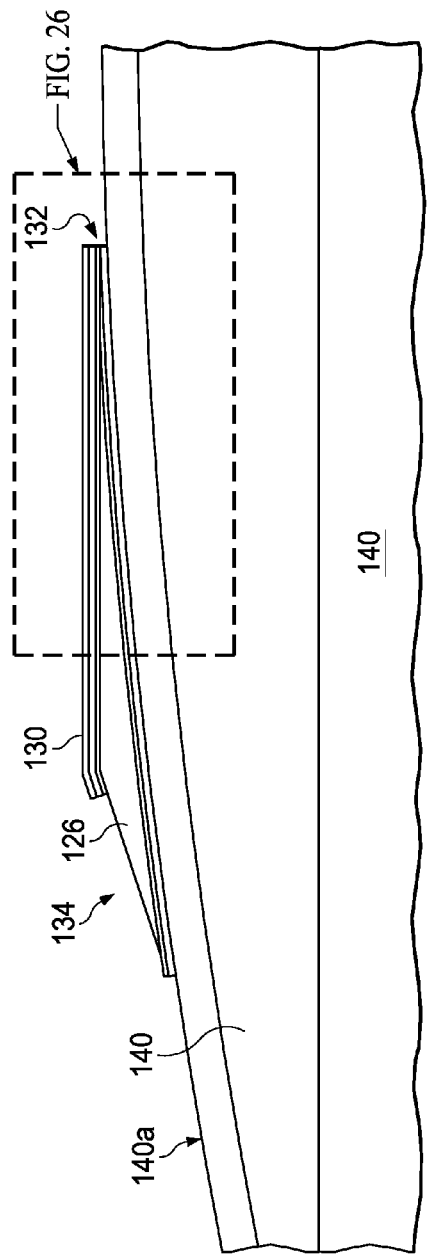
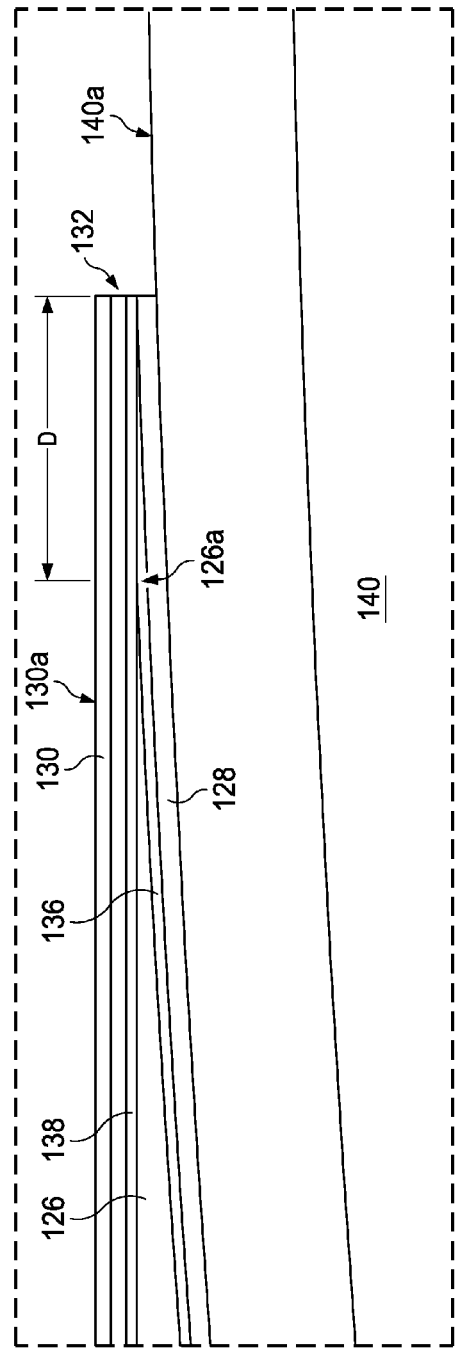

SOFTENING STRIP FOR CONTROLLING STRESS IN JOINTS AT VERY LOW TEMPERATURES

BACKGROUND INFORMATION

1. Field

The present disclosure generally relates to composite structures that are subjected to very low temperatures, and deals more particularly with joints in composite tanks used in space exploration and launch vehicles to contain liquids such as propellants at cryogenic temperatures.

2. Background

Certain composite structures are specifically designed for use in very low temperature environments. For example, spacecraft and launch vehicles often use tanks to store solid propellants or liquid fuels at cryogenic temperatures. In one design, a composite tank includes a cylindrical outer wall provided with a cylindrical skirt that is joined to dome-shaped ends by a bonded lap joint that is Y-shaped in cross-section. In order to control peak shear stresses in the joint caused by high line loads, a wedge shaped softening strip is placed in a gap between the cylindrical skirt and the dome shaped ends. The softening strip is formed of composite materials that remain compliant (strain) at cryogenic temperatures in order to reduce shear stress peaking in the joint, thereby enabling a smooth load transmission between the skirt and the dome shaped ends of the tank.

In order to assure smooth load transmission, it is necessary to achieve a precise fit-up of the softening strip within the Y-shaped gap. However, a precise fit-up requires tight dimensional control of the softening strip, and highly accurate placement within the gap. Precise fit-up and dimensional control of the softening strip is challenging for a number of reasons, including tolerance buildups during layup and machining of the softening strip, variability of adhesive bond line thicknesses, and the need to etch the softening strip prior to being bonded onto the tank, to name only a few. Once bonded to the tank, the softening strip cannot be re-machined to achieve the desired fit-up precision.

SUMMARY

The disclosure relates in general to joints formed between structures, and more specifically to softening strips placed in the joints for controlling stresses at very low temperatures.

According to one aspect, a softening strip is provided for controlling stresses in a joint at very low temperatures. A three dimensional fabric preform is adapted to be placed in the joint and is impregnated with a plastic that remains flexible at very low temperatures. A sacrificial layer of material is joined to the fabric preform. Material is removed from the sacrificial layer in order to fit the fabric preform within the joint.

According to another aspect, a method is provided of making a softening strip for controlling stress in a joint. The method comprises providing a flexible, fabric preform having first and second opposite sides, and surface profiling the fabric preform to a desired cross-sectional shape. The method also includes applying a first layer of rigid material to the first side of the fabric preform, and applying a second layer of rigid material to a second side of the fabric preform.

According to a further aspect, a method is provided of installing a softening strip for controlling stress in a joint of a structure. The method comprises forming a softening strip, including providing a flexible, fabric preform having first and second sides, and bonding a rigid layer of material to the first side of the fabric preform. Forming the softening strip further includes surface profiling the fabric preform to a desired cross-sectional shape, and bonding a second rigid layer of material to the second side of the fabric preform. The method also includes fitting the softening strip to the joint by tailoring the first rigid layer of material, placing the softening strip in the joint, and bonding the softening strip to the structure.

One of the advantages of the embodiments is that relatively thin bond lines of consistent thickness may be achieved between the softening strip and a structure to which it is bonded. Further, the amount of adhesive required to bond the softening strip to the structure is reduced.

Another advantage is that the OML surface of the softening strip can be modified after being bonded to the structure in order to account for installation tolerances and achieve a more precise fit in the joint. As a result, a substantially consistent, uniform softening strip OML is achieved facilitating installation.

A further advantage of the embodiments is that the thickness of a tip of the softening strip can be increased by bonding layers of rigid material opposite sides of the softening strip. Also, the layers of rigid material protect the softening strip against tearing during final machining on the softening strip after it is bonded to the structure.

A still further damage of the embodiments is that a softening strip is produced having tighter tolerances which improve the ability to locate and reference the softening strip to a structure during assembly.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 6 is an illustration of a fragmentary, side view in the direction of the arrow designated as "6" in FIG. 5;

FIG. 7 is an illustration of a diagrammatic cross-sectional view of the hybrid softening strip shown in FIGS. 4, 5 and 6;

FIG. 8 is an illustration of a partial perspective view of one of a section of the hybrid softening strip;

FIG. 22 is an illustration of one and of the cure tool shown in FIG. 21;

FIG. 23 is an illustration of the area designated as "FIG. 23" in FIG. 22;

FIG. 25 is an illustration similar to FIG. 22 but showing the outboard sacrificial layer;

FIG. 26 is an illustration of the area designated as "FIG. 26" in FIG. 25;

DETAILED DESCRIPTION

Figure 1:
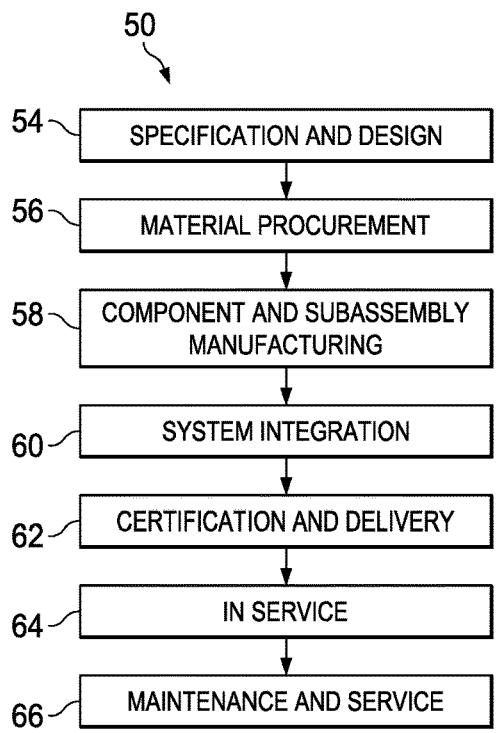
FIG. 1 is an illustration of a diagram showing a spacecraft manufacturing and service method in which an embodiment may be implemented.
Figure 2:
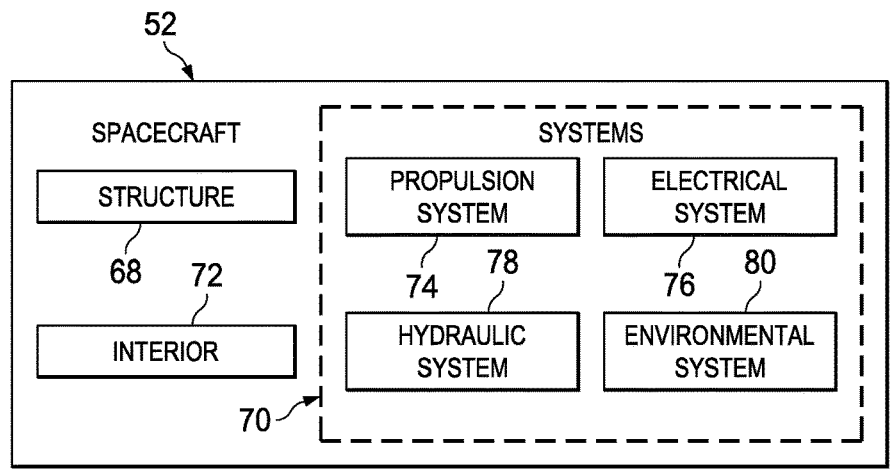
FIG. 2 is an illustration of a diagram of a spacecraft in which embodiments may be implemented.

Referring to the drawings, embodiments of the disclosure may be described in the context of a spacecraft manufacturing and service method 50 shown in FIG. 1, and a spacecraft 52 shown in FIG. 2. During pre-production, exemplary spacecraft manufacturing and service method 50 may include specification and design 54 of the spacecraft 52 and material procurement 56. During production, component and subassembly manufacturing 58 and system integration 60 of spacecraft 52 in FIG. 2 takes place. Thereafter, the spacecraft 52 may go through certification and delivery 62 in order to be placed in service 64. While in service by a customer, spacecraft 52 scheduled for routine maintenance and service 66, which may include modification, reconfiguration, refurbishment, and other maintenance or service.

Each of the processes of spacecraft manufacturing and service method 50 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, for example, without limitation, any number of venders, subcontractors, and suppliers; and an operator may be a country, leasing company, military entity, service organization, and so on.

Referring now to FIG. 2, a diagram of a spacecraft 52 is depicted in which embodiments may be implemented. In this example, spacecraft 52 may be produced by the spacecraft manufacturing and service method 50 shown in FIG. 1. Spacecraft 52 may include structure 68 with a plurality of systems 70 and interior 72. Examples of systems 70 include, for example, without limitation, one or more of propulsion system 74, electrical system 76, hydraulic system 78, and environmental system 80. Any number of systems may be included. Further, in some implementations some of the systems may not be needed. For example, when spacecraft takes the form of a launch vehicle, environmental system 80 may be unnecessary.

Apparatus and methods embodied herein may be employed during any one of stages of spacecraft manufacturing and service method 50 in FIG. 1. For example, components or subassemblies produced in component and subassembly manufacturing 58 in FIG. 1 may be fabricated or manufactured in a manner similar to components or subassemblies produced while spacecraft 52 is in service 64 in FIG. 1.

Also, one or more apparatus embodiments, method embodiments, or a combination thereof may be utilized during production stages, such as component and subassembly manufacturing 58 and system integration 60 in FIG. 1 as an example, without limitation. These embodiments may substantially expedite the assembly of or reduce the cost of spacecraft 52.

Figure 3:
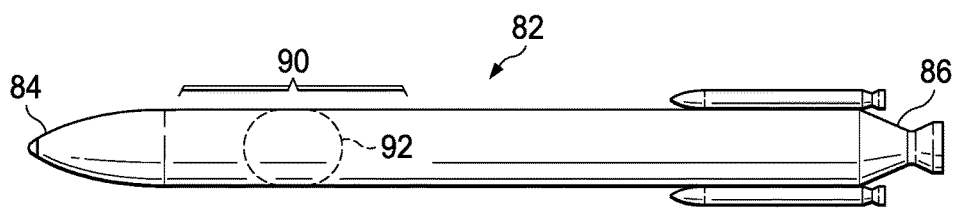
FIG. 3 is an illustration of a side elevational view showing an exemplary spacecraft.

In these examples, embodiments may be implemented to attach components in propulsion system 74 to structure 68 in spacecraft 52. The different embodiments may be applied to attach any structure within spacecraft 52 to any other structure in other implementations. For example, referring to FIG. 3, a spacecraft launch vehicle 82 includes a forward section and an aft section 86. A section 90 of the launch vehicle 82 includes a cryogenic tank 92 holding a propellant such as, for example and without limitation, liquid hydrogen or liquid oxygen a cryogenic temperatures, i.e. at or below −150° C.

Figure 4:
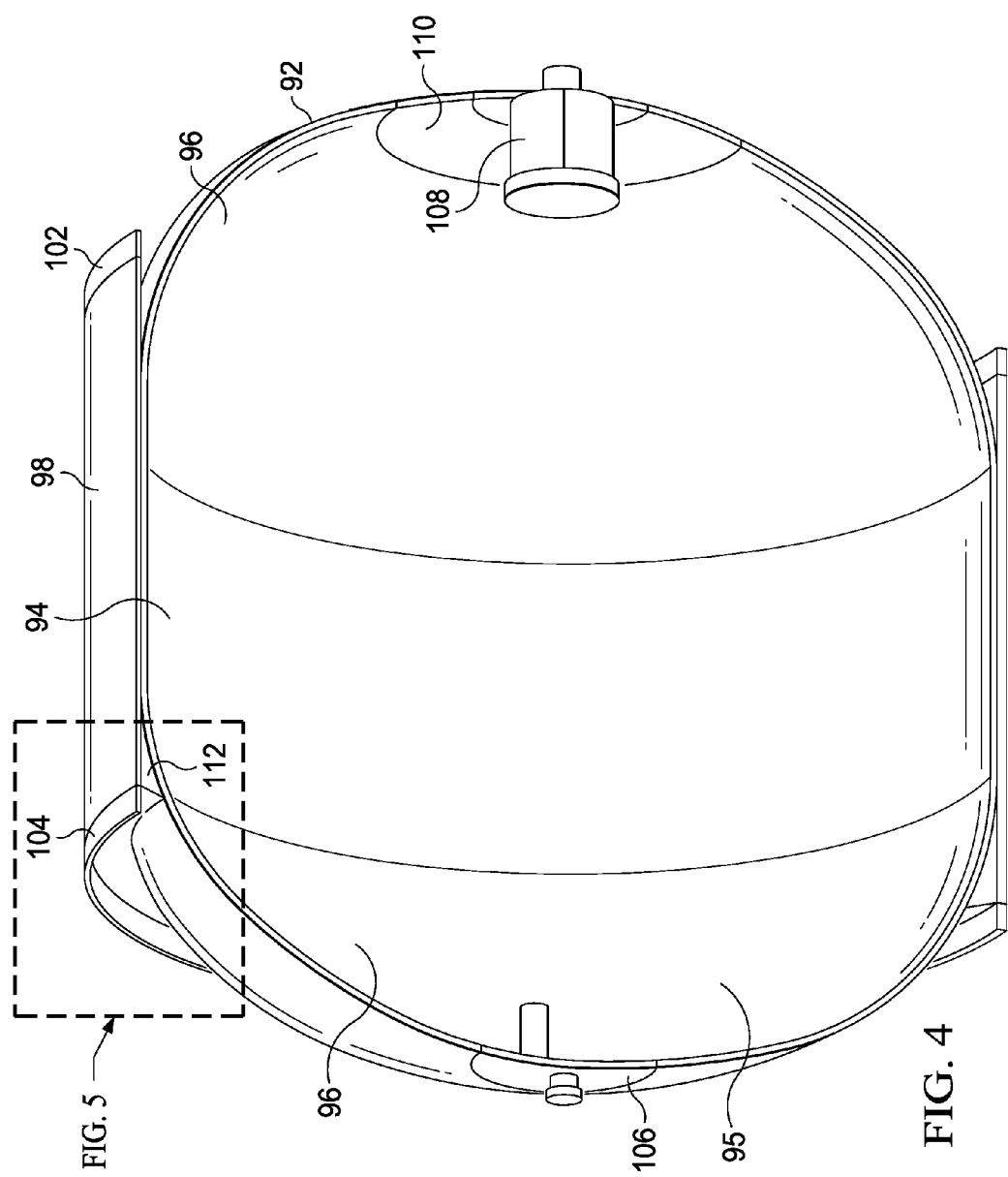
FIG. 4 is an illustration of a perspective view of a tank, wherein a surrounding cylindrical skirt been broken away in cross-section.

FIG. 4 illustrates one example of the tank 92 formed of laminated composites, such as, without limitation, carbon fiber epoxy. The tank 92 broadly includes a tank shell 95 surrounded by an outer cylindrical skirt 98. The tank shell 95 has a cylindrical wall 94 which transitions into hemispherical domed ends 96 on opposite ends of the cylindrical wall 94. One of the domed ends 96 includes a sump 108 provided with a sump cap 110, while the other domed end 96 is provided with a forward door 106. The cylindrical skirt 98 is bonded to the cylindrical wall 94, and extends fore and aft beyond the cylindrical wall 94.

Figure 5:
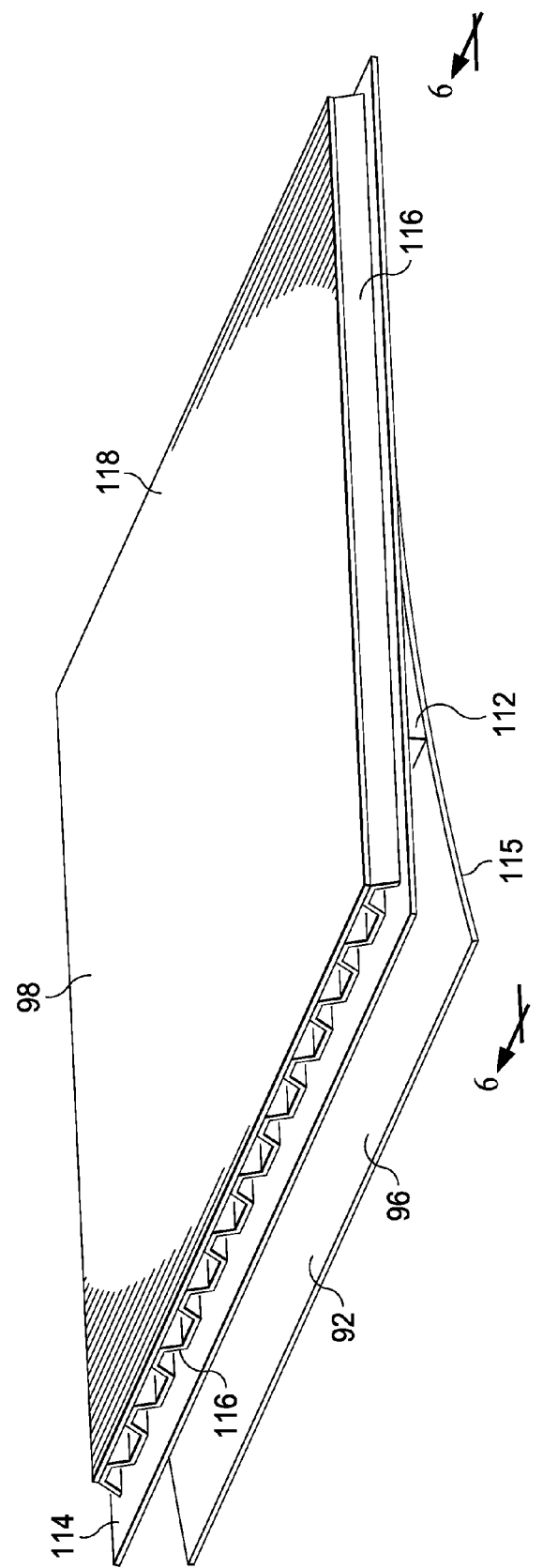
FIG. 5 is a an illustration of a perspective view showing a portion of the skirt, the underlying tank and the location of hybrid softening strip.

Referring now to FIGS. 4, 5 and 6, in one example, the skirt 98 comprises a core 116 sandwiched between inboard and outboard composite laminate skins 114, 118 respectively. The skins 114, 118 comprise a fiber reinforced thermoset, such as carbon fiber epoxy. The core 116 comprises a low density fluted structure that functions to transfer loads between the inboard and outboard skins 114, 118. Core 116 may take other forms, however such as a honeycomb or a foam. The extension of the cylindrical skirt 98 beyond the cylindrical wall 94 (FIG. 4) forms a Y-shaped gap 115 between the curved dome end 96 and the inboard skin 114 of the skirt 98. The Y-shaped gap extends around the entire circumference of the tank 92.

A hybrid softening strip 112 (hereinafter "HSS") having a generally wedge-shaped cross-section tapering to an outer knife edge tip 132, is installed in and fills the gap 115 to form a Y-shaped joint 125 between the tank shell 95 and the skirt 98. The HSS 112 comprises a plurality of individual HSS segments that are arranged in end-to-end abutting relationship to each other and extend around the entire circumference of the tank shell 95. Butt joints between the ends of the segments may be filled with a suitable paste adhesive. The HSS 112 is bonded to the tank shell 95 and to the inboard skin 114 of the skirt 98. As will be discussed below in more detail, the HSS 112 is flexible at room temperature, and remains flexible at low temperatures, such as cryogenic temperatures. The HSS 112 functions to strain and thereby reduce peak stresses within the Y-shaped joint 125 occurring at these low temperatures.

While in the illustrated example, the HSS 112 reduces peak stresses in a joint at cryogenic temperatures, i.e. at or below −150° C., in some applications it may also be useful in reducing stresses in joints at low temperatures that are somewhat higher than cryogenic temperatures. Thus, as used herein, "low temperatures" includes both cryogenic temperatures and temperatures that may be above cryogenic temperatures, for example and without limitation, −100° to −150° C. It should be noted here that while, in the illustrated example, the HSS 112 is installed in a Y-shaped joint 125 between a tank shell 95 and skirt 98, the HSS 112 may be used in other types of joints in any of a wide variety of applications to reduce joint stress at very low temperatures.

FIG. 7 diagrammatically illustrates both the cross-sectional shape and general construction of the HSS 112. The HSS 112 comprises a flexible 3-D (three-dimensional) fabric preform 126 sandwiched between a rigid inboard or IML (inner mold line) stiffening layer 128 of material, and a rigid outboard or OML (outer mold line) sacrificial layer 130 of material. The inboard stiffening layer 128 and the outboard sacrificial layer 130 are respectively bonded to opposite sides 135, 145 of the fabric preform 126. Thus, the HSS 112 is a hybrid structure broadly comprising two substantially rigid outer layers 128, 130, and an inner flexible 3-D fabric preform 126. The two substantially rigid outer layers 128, 130 transfer loads from the skirt 98 and the tank shell 95 to the 3-D fabric preform 126 which remains flexible and strains to reduce stresses within the joint 125 at very low temperatures.

The inboard stiffening layer 128 and the outboard sacrificial layer 130 converge to form a knife edge tip 132 that extends into the innermost recess of the Y-shaped gap 115, at the location where the domed end 96 transitions into the cylindrical wall 94 and meets the inboard skin 114 of the skirt 98. For purposes discussed below in more detail, the knife edge tip 132 formed by the convergence of the inboard and outboard layers 128, 130 extends beyond the outer tip 126a of 3-D fabric preform 126. In the illustrated example, the outward facing side 134 of the fabric preform 126 is beveled, however in other examples, the outer facing side 134 may not be beveled, depending on the application. Both the inboard and outboard layers 128, 130 comprise fiber reinforced plastic, such as carbon fiber epoxy in which the reinforcing fibers have unidirectional or multidirectional fiber orientations. However, the inboard and outboard layers 128, 130 may be formed of other rigid materials in some applications.

Attention is now directed to FIG. 8 which illustrates additional details of the HSS 112. In this example, the inboard stiffening layer 128 comprises one ply of fiber reinforced plastic, such as, without limitation, carbon fiber epoxy, however in other examples, inboard stiffening layer 128 may comprise multiple plies of fiber reinforced plastic in which the reinforcing fibers are unidirectional or multidirectional. The inboard stiffening layer 128 is bonded to the 3-D fabric preform 126 by a layer of adhesive 136, which may comprise a film adhesive. In the illustrated embodiment, the outboard sacrificial layer 130 comprises two or more plies of fiber reinforced plastic, however in other embodiments a single ply having a thickness sufficient to allow the desired surface profiling may be employed.

The inboard stiffening layer 128 includes a faying surface 128a that is adapted to be bonded to the tank shell 95, and the outboard sacrificial layer 130 includes a faying surface 130a that is adapted to be bonded to the inboard skin 114 of the skirt 98. As will be discussed below, the rigid inboard and outboard layers 128, 130 function to stiffen the knife edge tip 132 and permit the HSS 112 to be machined to a desired thickness profile, while also protecting the edge of the 3-D fabric preform 126 against tearing during such machining.

Figure 9:
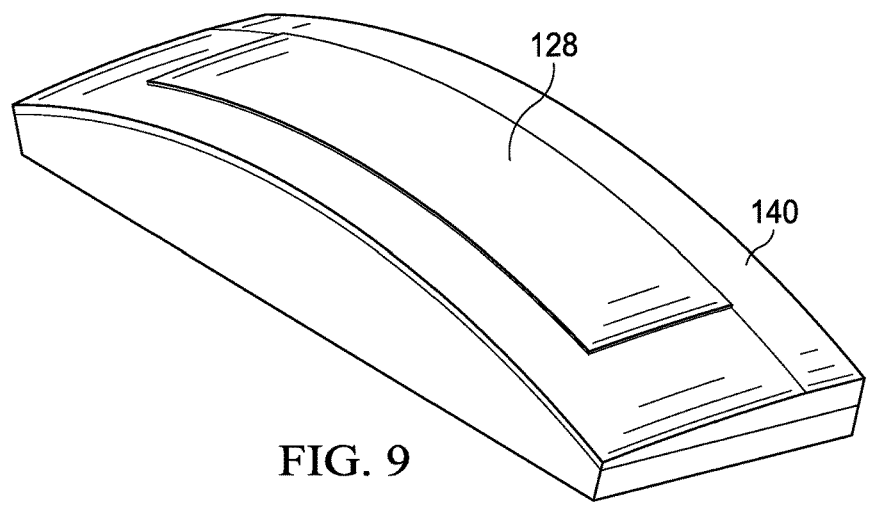
FIG. 9 is an illustration of a perspective view showing an inboard stiffening layer on a cure mandrel.
Figure 10:
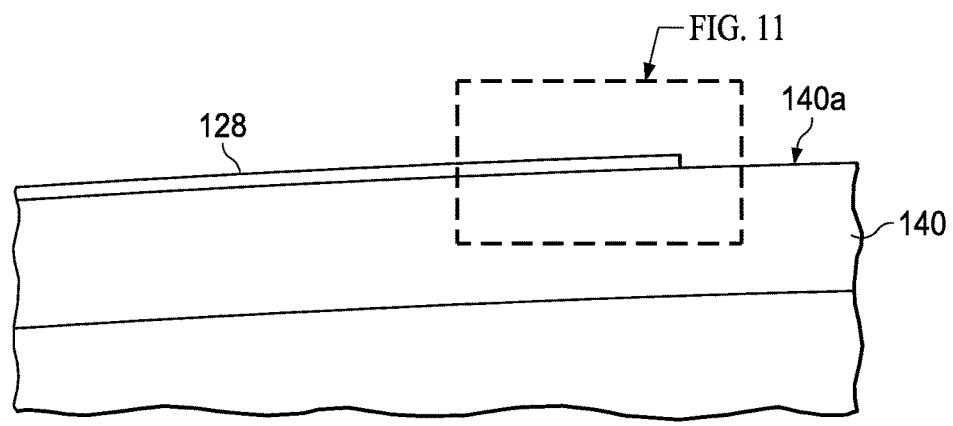
FIG. 10 is an illustration of a side view of one end of the cure mandrel shown in FIG. 9.
Figure 11:
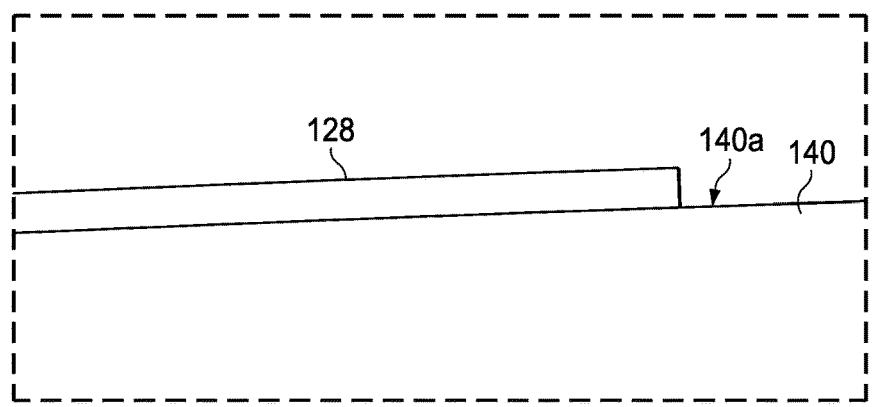
FIG. 11 is an illustration of the area designated as "FIG. 11" in FIG. 10.
Figure 12:
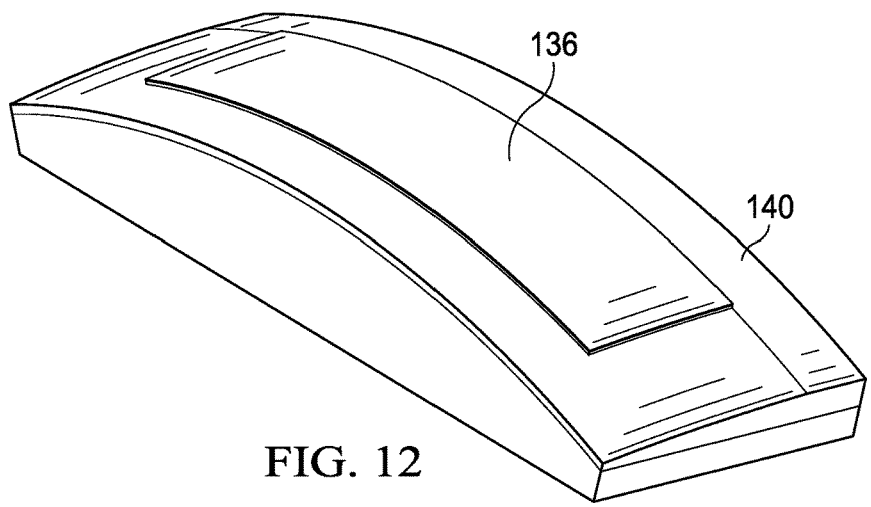
FIG. 12 is an illustration similar to FIG. 9, but showing a film adhesive having been placed on the inboard stiffening layer.
Figure 13:
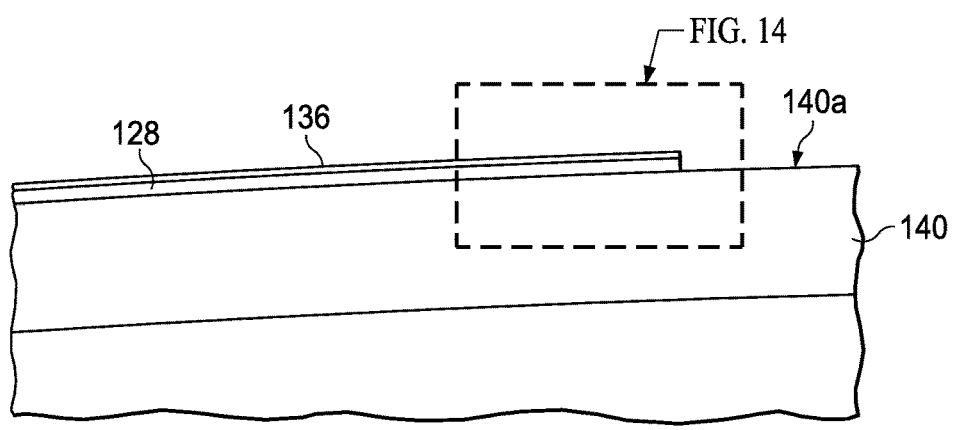
FIG. 13 is an illustration similar to FIG. 10, but showing the film adhesive.
Figure 14:
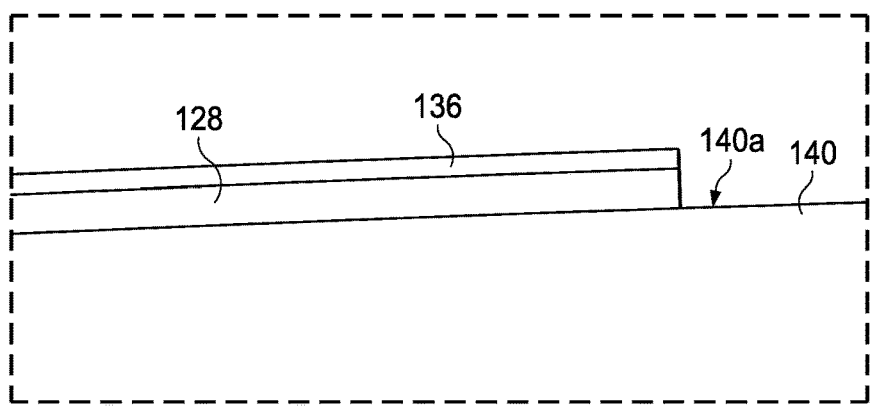
FIG. 14 is an illustration of the area designated as "FIG. 14" in FIG. 13.
Figure 15:
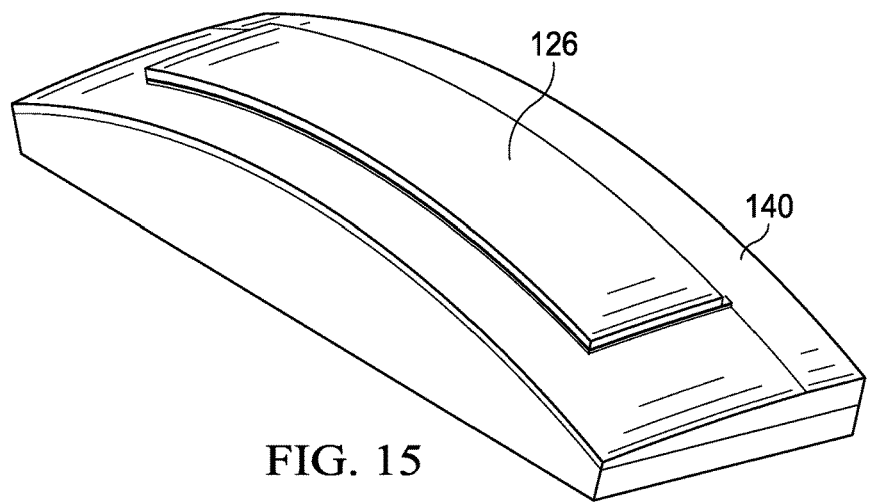
FIG. 15 is an illustration similar to FIG. 13, but showing a 3-D fabric preform having been bonded to the IML stiffening layer.
Figure 16:
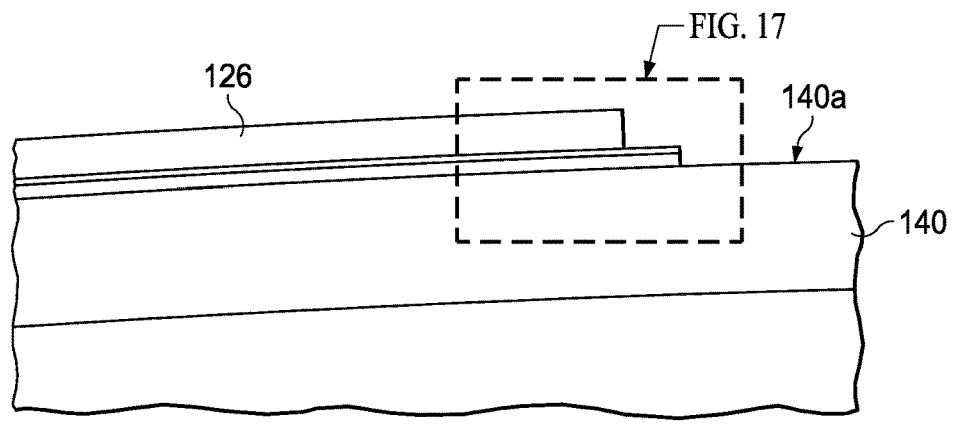
FIG. 16 is an illustration similar to FIG. 13, but showing the 3-D fabric preform.
Figure 17:
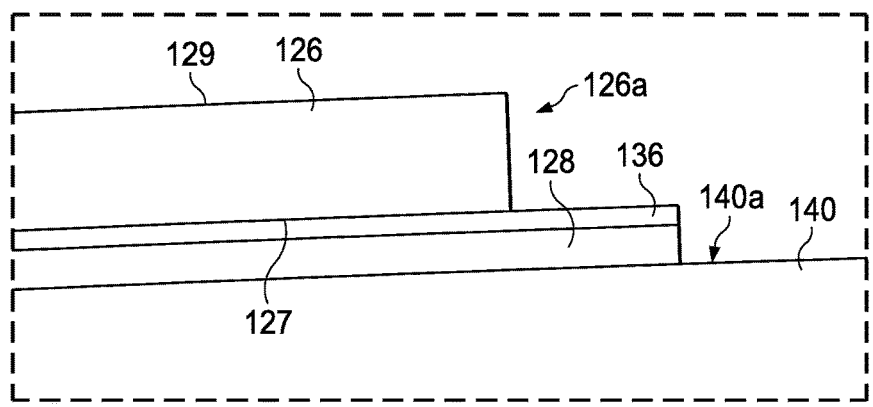
FIG. 17 is an illustration of the area designated as "FIG. 17" in FIG. 16.

FIGS. 9-26 graphically illustrate one process for fabricating the HSS 112. Referring to FIGS. 9-11, the inboard stiffening layer 128 is formed by laying up a ply of fiber reinforced plastic prepreg, such as carbon fiber epoxy, having a substantially rectangular shape. The prepreg ply is laid up on a rigid cure mandrel 140 having a curvature matching the curvature of the inboard skin 114 of the skirt 98. This ply may be hand cut or cut with an ultrasonic knife to the desired shape/size, and placed manually or automatically on the mandrel 140. Next, as shown in FIGS. 12-14, a film adhesive 136 is placed on the underlying ply that forms the inboard stiffening layer 128. Then, as shown in FIGS. 15-17, a pre-cut 3-D fabric preform 126 having a rectangular shape and the desired thickness is placed on the film adhesive 136.

The 3-D fabric preform 126 may comprise any suitable assembly of interlacing fibers, filaments or yarns (collectively hereinafter referred to as "fibers"), or any combination thereof that are assembled by any of various known processes including, without limitation, weaving, knitting, braiding, felting and twisting, or any combination of these processes. The fabric preform 126 may also be assembled by stacking layers of fibers. The fibers may include, for example and without limitation, carbon fibers, glass fibers, aramid fibers metal fibers, ceramic fibers or a combination of these or other fibers suitable for the application. The fibers are either produced to the desired fabric preform size and shape, or a blank of the fibers can be cut to the desired size. The 3-D fabric preform 126 is impregnated with plastic that is flexible at very low temperatures such as cryogenic temperatures. The plastic may be any synthetic or semi-synthetic polymerization material or product such as, without limitation, fluorocarbons and urethanes. One example of a suitable fluorocarbon is Teflon®. In one exemplary application, the 3-D fabric preform is a 3-D woven carbon fiber preform infused with fluorinated ethylene propylene (FEP), as described more fully in US Patent Publication No. 2010/0012787, published Jan. 21, 2010, and entitled "Strong Bonded Joints for Cryogenic Application".

Following the impregnation, the IML surface 127 (FIG. 17) of the 3-D fabric preform 126 is etched using a suitable etchant such as Tetra-Etch®, to improve its ability be bonded by the adhesive film 136 to the underlying inboard stiffening layer 128. As will become later apparent, there is no need to similarly etch the OML surface 129 of the fabric preform 126 because this surface is effectively roughened during a subsequent machining operation used to profile the fabric preform 126 to its final shape.

The 3-D fabric preform 126 is cold worked by forcing it down onto the surface 140a the mandrel 140, thereby fracturing the thermoplastic binder and allowing the fibers of the fabric preform 126 to flex and remain flexible. The length of the 3-D fabric preform 126 is slightly less than the length of the underlying inboard stiffening layer 128, as best seen in FIG. 17, such that layer 128 extends beyond the ends 126a of the fabric preform 126. At this point, the cross-sectional profile of the fabric preform 126 is substantially rectangular. Next, the 3-D fabric preform 126 is bonded to the underlying inboard stiffening layer 128 by vacuum bagging the mandrel 140 and placing it in an oven (not shown). The subassembly comprising adhesive film layer 136 and the inboard stiffening layer 128 is thermally cured in the oven, causing the fabric preform 126 to be bonded to the stiffening layer 128 and permanently taking the curvature of the tool surface 140a.

Figure 18:
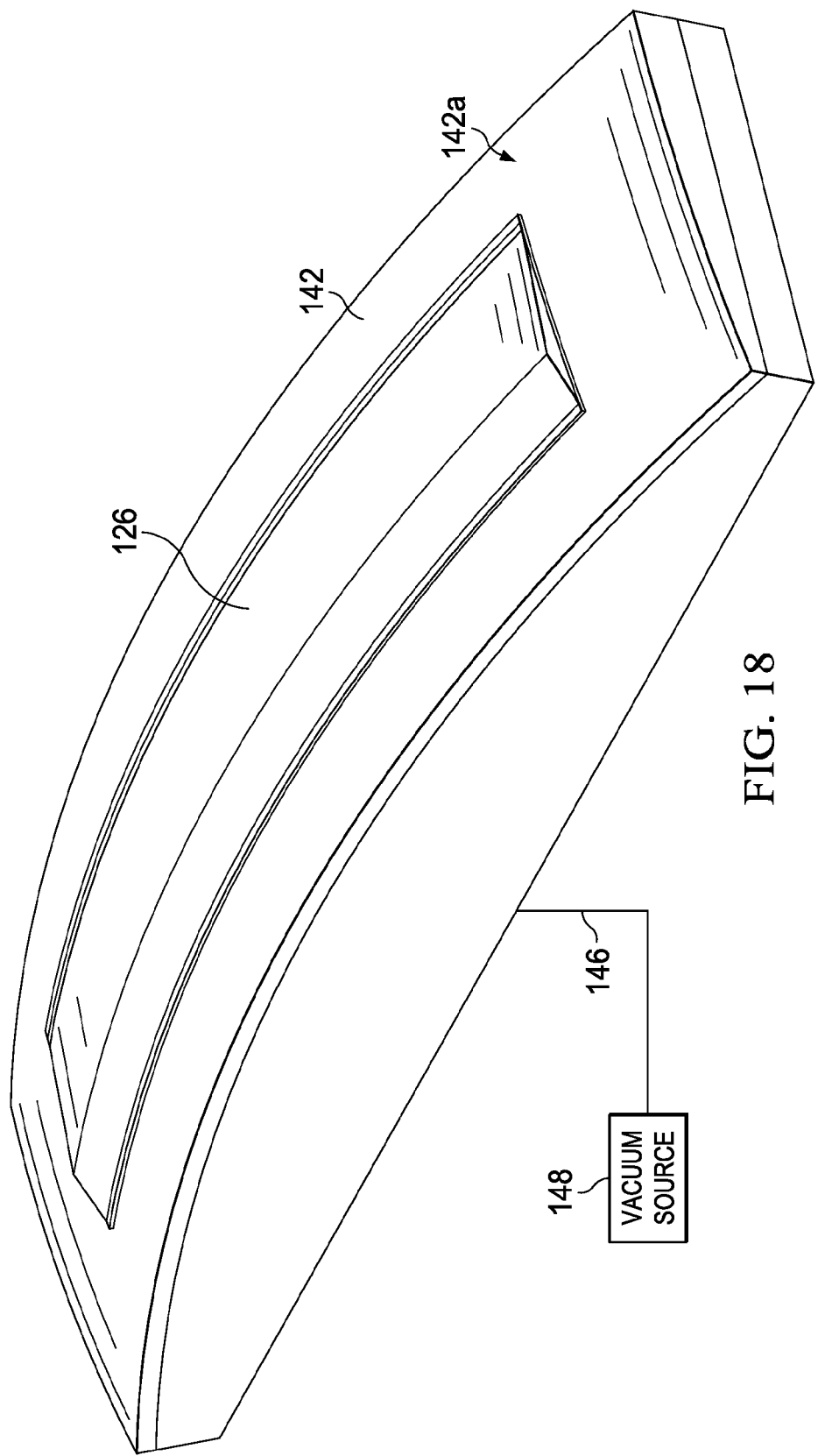
FIG. 18 is an illustration of a perspective view of the hybrid softening strip on a foam vacuum tool after the 3-D fabric preform has been surface profiled.
Figure 19:
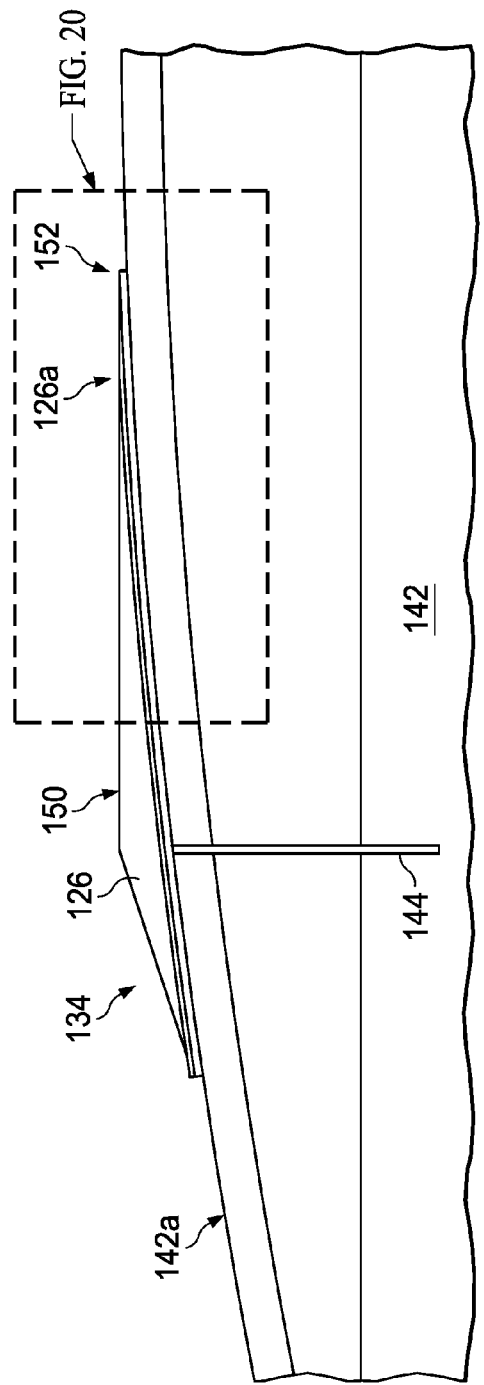
FIG. 19 is an illustration of one end of the vacuum tool shown in FIG. 18, better illustrating the surface profile of the 3-D fabric preform.
Figure 20:
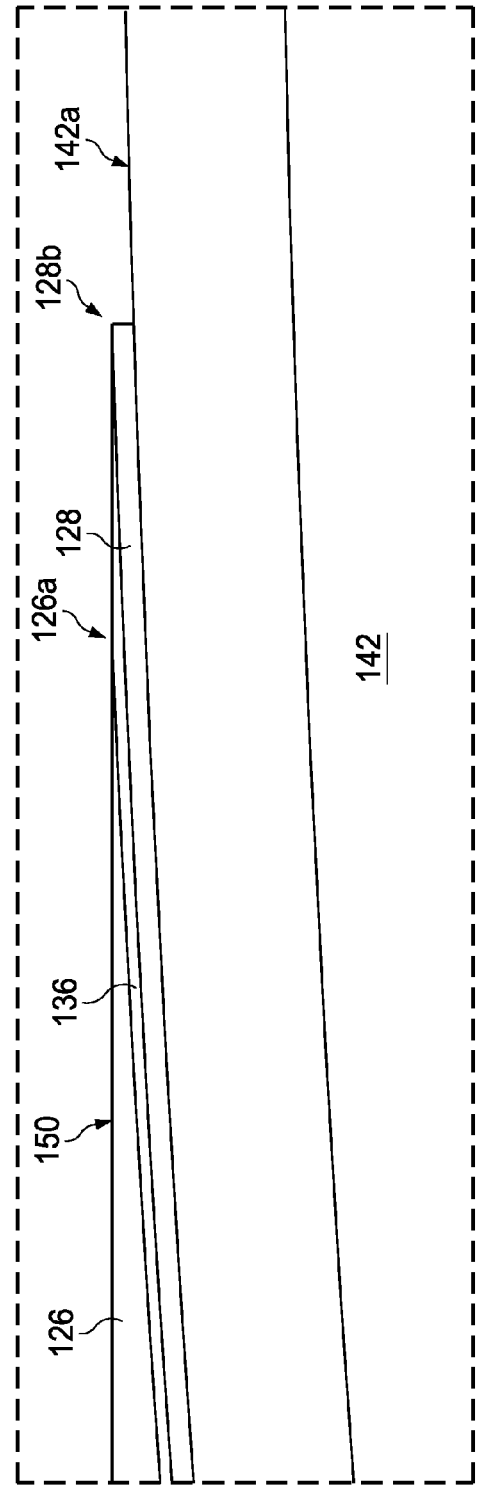
FIG. 20 is an illustration of the area designated as "FIG. 20" in FIG. 19.

Referring now to FIGS. 18-20, the cured and bonded subassembly of the fabric preform 126 and stiffening layer 128 is transferred to a foam vacuum tool 142 having a curvature matching that of the cured stiffening layer 128. The vacuum tool 142 may include a series of apertures 144 in its tool surface 142a connected by a vacuum line to a vacuum source 148 that generates a vacuum which holds the subassembly on the vacuum tool 142. In other examples, the tool 142 may include a recess (not shown) for holding and retaining the subassembly. Material is then removed from the top 150 (FIGS. 19 and 20) of the fabric preform 126, as by N/C machining, sanding, grinding or other suitable material removal techniques, effectively surface profiling the fabric preform 126 to achieve a desired nominal fabric preform shape and thickness. In the illustrated example, the material removal step described above effectively tapers the fabric preform 126 into a wedge cross sectional shape having a relatively sharp tip 126a. The tip 128b of the underlying inboard stiffening layer 128 extends beyond the fabric preform tip 126a. In other embodiments, particularly those in which high production rates are required, the tool 142 may be metal tool, and/or may be the mandrel 140 (FIGS. 9-17). It should be noted here that the material removal process results in the top 150 of the fabric preform 126 having a relatively rough surface finish suitable for subsequent bonding to the outboard sacrificial layer 130, without the need for etching or other surface treatments.

Figure 21:
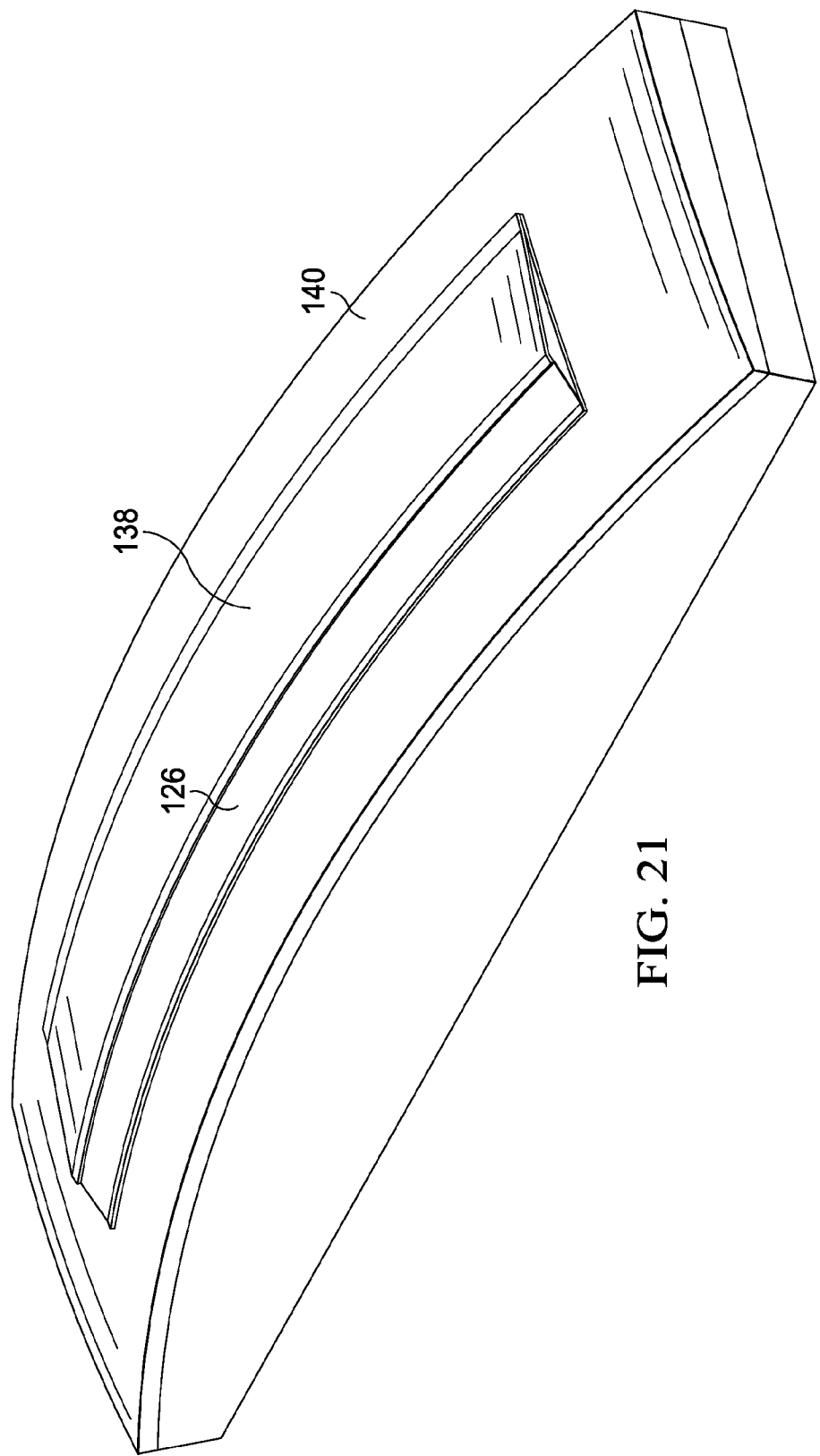
FIG. 21 is an illustration of a perspective view of the cure tool in which a film adhesive has been applied to the profiled 3-D fabric preform.
Figure 24:
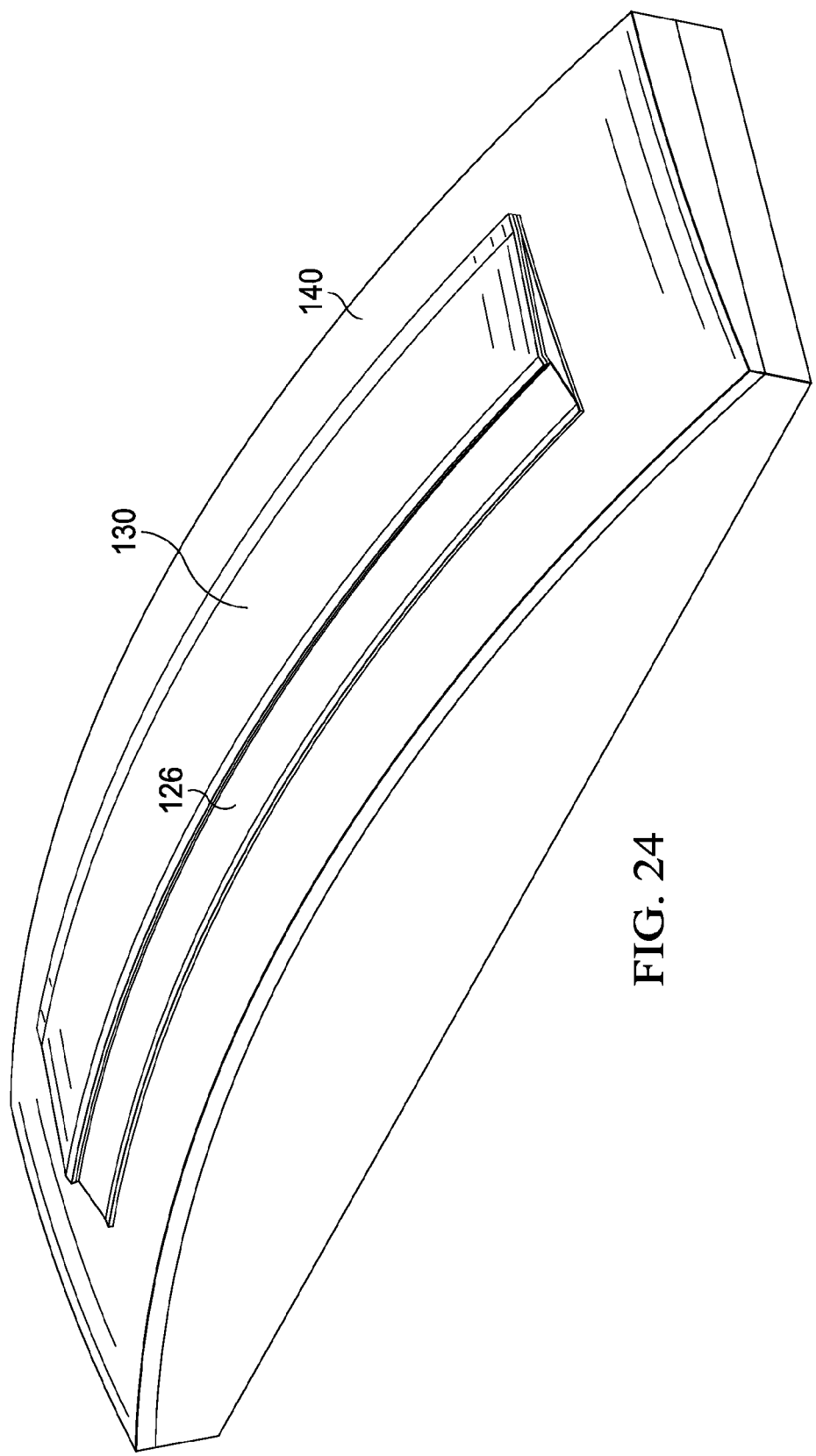
FIG. 24 is an illustration similar to FIG. 21 but showing an outboard sacrificial layer applied over the film adhesive.
Figure 27:
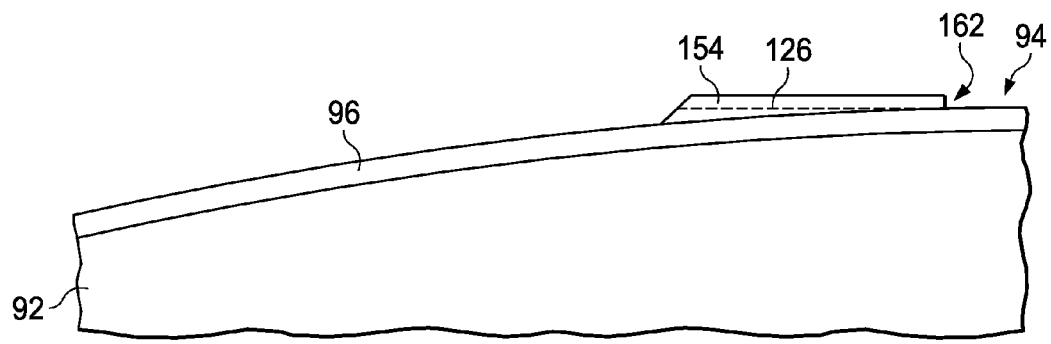
FIG. 27 is an illustration of a fragmentary, longitudinal cross-sectional view of the tank, showing the hybrid softening strip bonded and indexed to a nominal position on the tank, prior to being surface profiled.
Figure 28:
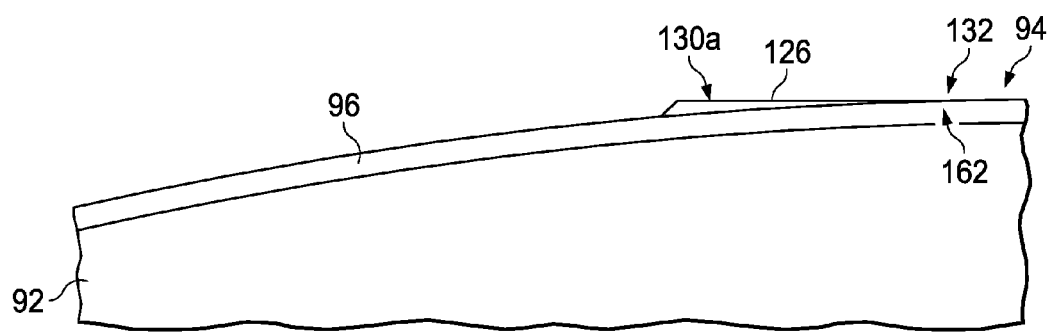
FIG. 28 is an illustration similar to FIG. 27 but showing the hybrid softening strip having been surface profiled to final shape.

Referring to FIGS. 21-23, following surface profiling of the fabric preform 126, a layer of adhesive film 138 placed on the forward section of the fabric preform 126. Next, as shown in FIGS. 24-26, the outboard sacrificial layer 130 is placed on top of the adhesive film layer 138, as by laying up plies of prepreg, either by hand or automatically by machine. The prepreg plies are hand cut or cut with an ultrasonic knife to the desired shape from sheets of unidirectional or woven prepreg. As best seen in FIG. 28, both the inboard stiffening layer 128 and the outboard sacrificial layer 130 extend beyond the tip 126a of the fabric preform 126 a distance "D", and converge to form the knife edge tip 132.

Figure 29:
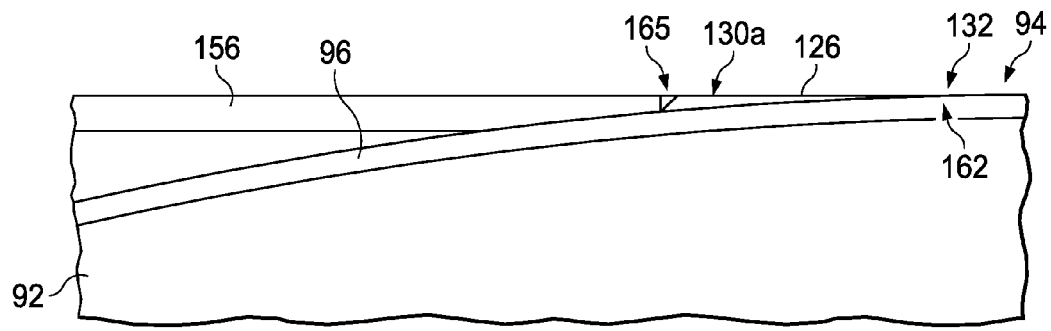
FIG. 29 is an illustration similar to FIG. 28, but showing a skirt alignment fixture having been installed on the tank.
Figure 30:
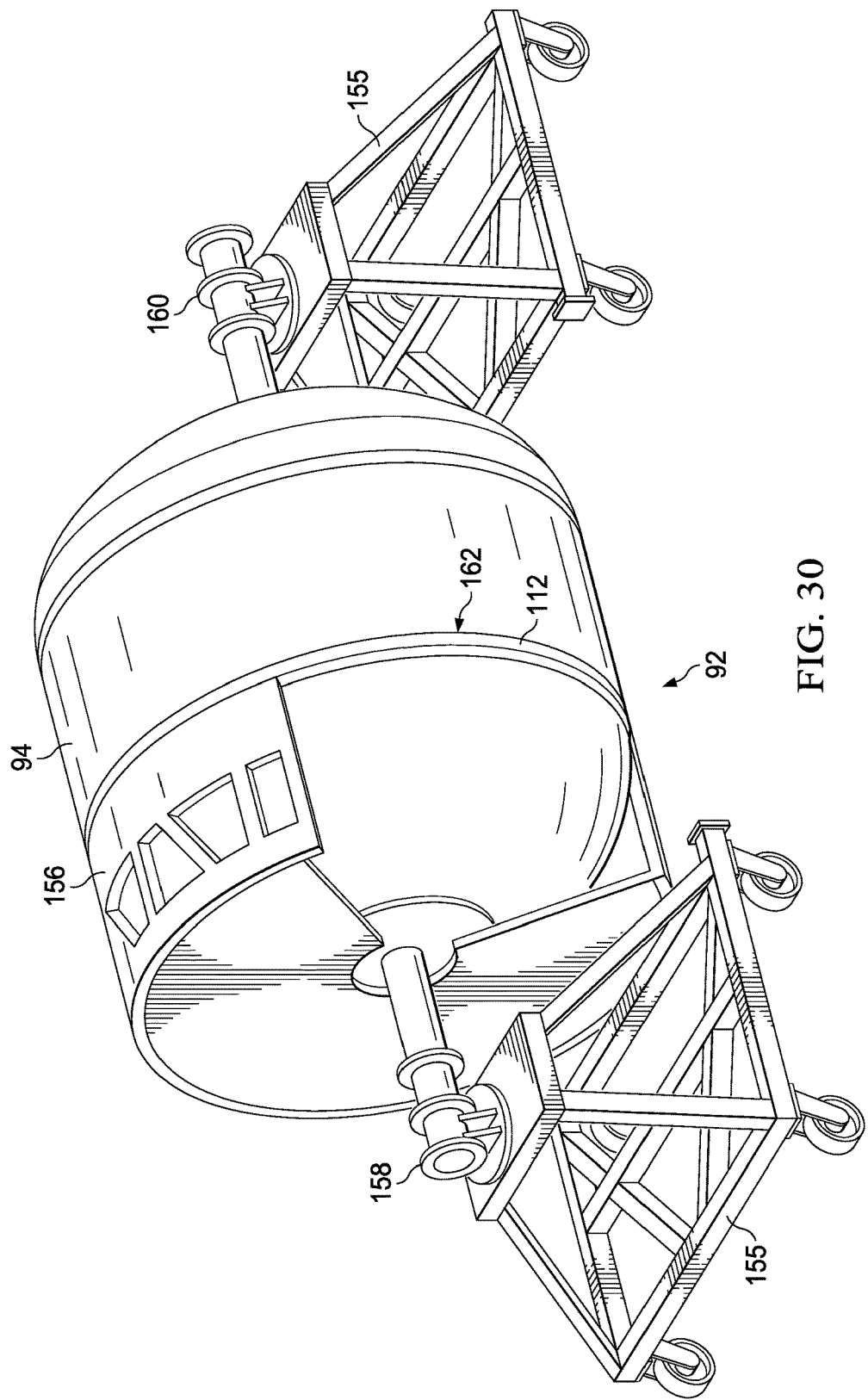
FIG. 30 is an illustration of a perspective view of the tank, showing several segments of the skirt alignment fixture in relation to the hybrid softening strip.

Attention is now directed to FIGS. 27-30. As shown in FIG. 30, the tank 92 may be mounted for rotation on mobile supports 155 by a headstock 158 and a tail stock 160. As previously mentioned, the HSS 112 is formed in segments circumferentially arranged in end-to-end abutment around the circumference of the tank 92. Each segment of the HSS 112 is placed on the tank 92, with the knife edge tip 132 nominally indexed to a reference line 162 on the cylindrical wall of the tank 92. The reference line 162 may be projected onto the tank 92 by a laser (not shown). The segments of the HSS 112 are adhered to the surface of the domed end 96 by a film adhesive (not shown) which is then cured, bonding the segments on the tank 92. After the HSS 112 segments have been indexed and bonded on the tank 92 as described above, the dimensions, and particularly the curvature of the tank 92 are measured, and based on these measurements, a profile of the HSS 112 is determined that will provide a best fit between the tank shell 95 and the skirt 98.

Based on the surface profile determined to provide a best-fit, material 154 (FIG. 27) is removed from the top (OML) of the outboard sacrificial layer 130, as by sanding or other suitable techniques, so that the faying surface 130a lies flush with, and forms an extension of the tank cylindrical surface 94. Profiling the sacrificial layer 130 to match cylindrical tank wall 94, provides a continuous cylindrical faying surface 130a on which the tank skirt 98 is laid up, and minimizes the bond line (not shown) between the skirt 98 the tank 92. It should be noted here that the presence of rigid plies forming the OML sacrificial layer 130 protects the tip 126a (FIG. 20) of the underlying fabric preform 126, and allows the HSS 112 to be machined to the knife edge tip 132 without damaging the fabric preform tip 126a.

Referring now to FIGS. 29 and 30, after the HSS 112 has been surface profiled to match the outer surface of the tank wall 94, a skirt assembly fixture 156 is installed on the tank 92 and HSS 112, both of which have been pre-cured. The skirt assembly fixture 156 provides a continuous cylindrical surface for supporting the outer ends of the skirt 98 as the skirt 98 is being laid up on the tank 92. After the skirt 98 has been laid up, the tank is placed in the oven to cure the components of the skirt 98 and adhesively bond the skirt 98 to the tank 92 and to the HSS 112. Prior to this curing operation, a notch 165 between the outer facing side 134 (FIG. 8) of the HSS 112 and the assembly fixture 156 is filled with a fly-away adhesive to assure a vacuum tight seal during curing.

Figure 31:
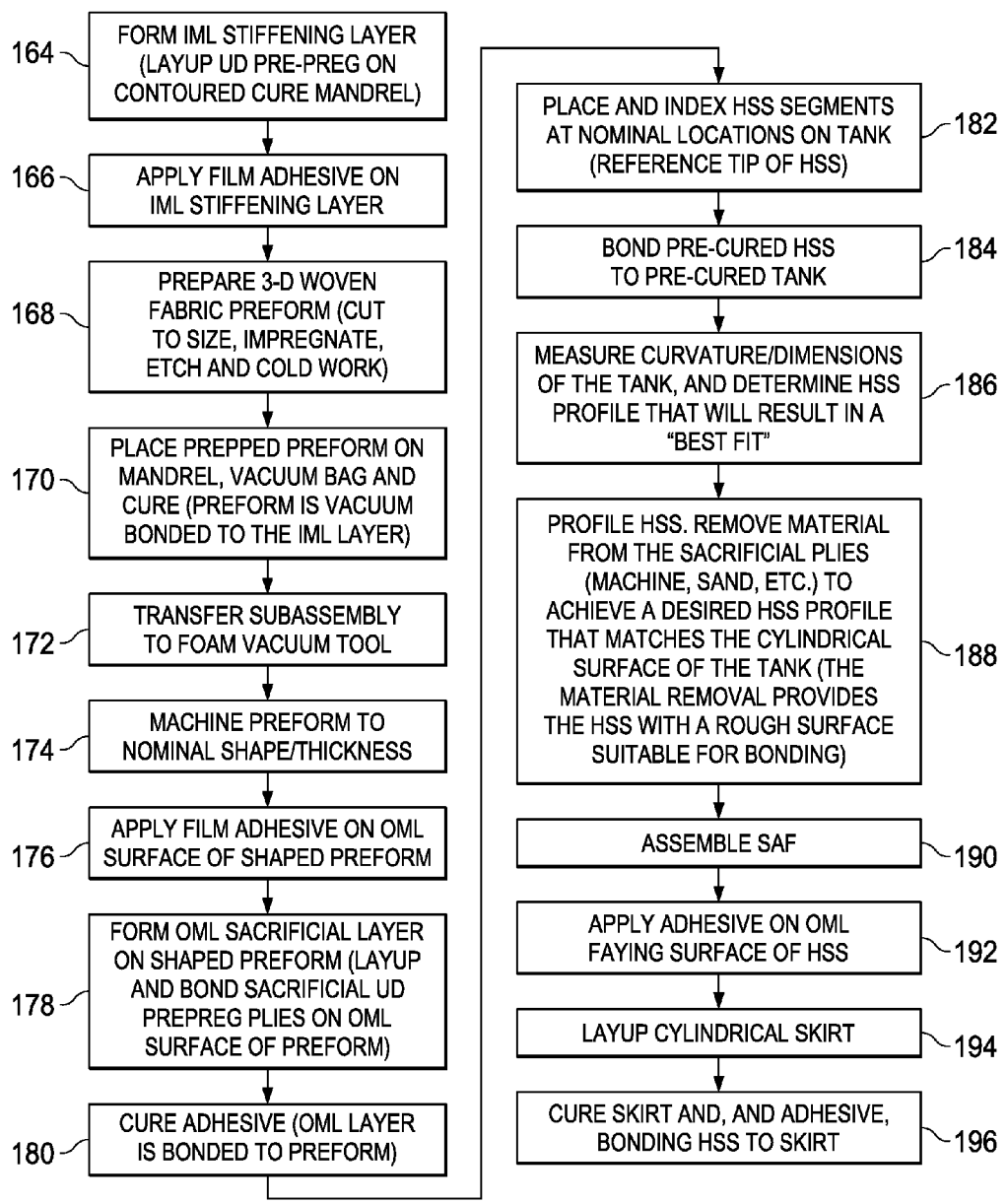
FIG. 31 is an illustration of a flow diagram of a method of installing a hybrid softening strip in a joint.

Attention is now directed to FIG. 31 which broadly illustrates the overall steps of a method of installing the HSS 112 within a Y-shaped joint 125 between two structures (e.g. the tank shell 95 and skirt 98) for controlling stress in a joint 125 that is subjected to low temperatures. Beginning at 164, an IML stiffening layer 128 is formed, as by laying up a prepreg composite ply on a contoured cure mandrel 140. At 166 a layer of film adhesive 136 is placed on the IML stiffening layer 128. At 168 a 3-D woven fabric preform 126 is prepared, including impregnating the 3-D woven fabric with a plastic, etching the surface of the fabric preform 126 and cold working it to render it flexible.

At 170, the prepped fabric preform 126 subassembly is placed on an adhesive film layer 136, and the subassembly of the fabric preform 126 and the stiffening layer 128 on the cure mandrel 140 is vacuum bagged and cured in order to bond the fabric preform 126 to the IML stiffener layer 128. At 172 the subassembly of the fabric preform 126 and stiffening layer 128 is transferred to a foam vacuum tool 142. At 174, the fabric preform 126 is machined to a nominal profile and thickness. At 176, a layer of film adhesive 138 is applied to the shaped fabric preform 126. At 178, an OML sacrificial layer is formed on the shaped fabric preform 126 by laying up and bonding sacrificial prepreg plies on the OML surface of the fabric preform 126. At 180, the subassembly including adhesive film layer 138 is cured, bonding the OML sacrificial layer 130 to the fabric preform 126.

At 182, segments of the HSS 112 are placed on the tank 92, using the knife edge tip 132 to index the segments to nominal reference line 162 on the tank 92. At 184, the pre-cured segments of the HSS 112 are bonded to the pre-cured tank 92 using a suitable film adhesive. At 186, the curvature and dimensions of the tank 92 are measured, and a final profile of the HSS 112 is determined that will result in a "best fit" between the tank 92 and the skirt 98. At 188, material is removed from the OML sacrificial layer 130 by machining, sanding, etc. to achieve an HSS profile and thickness that matches the cylindrical surface (wall 94) of the tank 92. Next, at 190, a skirt assembly fixture 156 is assembled to provide a surface on which portions of the skirt 98 may be laid up. At 192, an adhesive is applied to the OML faying surfaces of the tank 92 and/or IML faying surface 130a of the HSS 112. Then, at 194, the cylindrical skirt 98 is laid up over the tank 92, following which at 196, the assembly of the tank 92 and the skirt 98 are cured, bonding together the skirt 98, the HSS 112 and the tank 92.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method of making a softening strip for controlling stress in a joint, comprising:
   providing a flexible fabric preform having first and second opposite sides;
   surface profiling the fabric preform to a desired cross sectional shape;
   applying a first layer of rigid material to the first side of the fabric preform; and
   applying a second layer of rigid material to the second side of the fabric preform, as a sacrificial layer.

2. The method of claim 1, wherein the surface profiling is performed by removing material from the first side of the fabric preform.

3. The method of claim 1, wherein the surface profiling includes machining the fabric preform into a wedge cross sectional shape.

4. The method of claim 1, wherein the surface profiling includes forming a sharp tip on the fabric preform by tapering the fabric preform.

5. The method of claim 4, wherein applying the first and second rigid layers of material includes forming a knife edge tip of the material that covers the sharp tip of the fabric preform.

6. The method of claim 1, wherein applying the second layer of rigid material includes:
   laying up composite prepreg on a tool;
   placing a film adhesive on the composite prepreg;
   placing the fabric preform on the tool with the second side of the fabric preform in contact with the film adhesive;
   compacting the composite prepreg against the fabric preform; and
   forming a subassembly of the second layer of rigid material and the fabric preform by curing the composite prepreg and the film adhesive.

7. The method of claim 6, wherein the surface profiling of the fabric preform is performed after the subassembly has been formed.

8. The method of claim 7, wherein laying up composite prepreg on the first side of the fabric preform is performed after surface profiling of the fabric preform.

9. A method of installing a softening strip for controlling stress in a joint of a structure, the method comprising:
   forming the softening strip, comprising:
      providing a flexible, fabric preform comprising a first side and a second side configured as opposite sides;
      bonding a first rigid layer of material to the first side of the fabric preform;
      surface profiling the fabric preform to a desired cross sectional shape; and
      bonding a second rigid layer of material to the second side of the fabric preform; and
   fitting the softening strip to the joint, comprising:
      tailoring the first rigid layer of material;
      placing the softening strip in the joint; and
      bonding the softening strip to the structure.

10. The method of claim 9, wherein bonding the second rigid layer of material to the second side of the fabric preform comprises:
   laying up composite prepreg;
   placing a film adhesive on the composite prepreg;
   compacting the composite prepreg against the second side of the fabric preform; and
   curing the composite prepreg and the film adhesive.

11. The method of claim 9, wherein the surface profiling includes removing material from the fabric preform after the second rigid layer of material has been bonded to the fabric preform.

12. The method of claim 9, wherein the first rigid layer of material is bonded to the fabric preform after the surface profiling of the fabric preform.

13. The method of claim 9, wherein fitting the softening strip comprises:
   determining a profile of the first rigid layer of material that will provide a best fit of the softening strip within the joint; and
   tailoring the first rigid layer of material to match the profile by removing material from the first rigid layer.

14. The method of claim 13, wherein tailoring the first rigid layer of material includes forming a knife edge tip on the softening strip.

\* \* \* \* \*